United States Patent [19]
Fidan et al.

[11] Patent Number: 6,136,371
[45] Date of Patent: Oct. 24, 2000

[54] PROCESS FOR MAKING MASKING TAPE AND APPARATUS

[75] Inventors: Muzaffer Fidan; Donald H. Lackey, both of Hickory, N.C.

[73] Assignee: Shurtape Technologies, Inc., Hickory, N.C.

[21] Appl. No.: 09/501,673

[22] Filed: Feb. 10, 2000

[51] Int. Cl.⁷ ......................................................... B05D 5/10
[52] U.S. Cl. ........................... 427/208.4; 118/60; 118/68; 118/101; 118/118; 118/123; 118/319; 118/325; 427/208.8; 427/210; 427/244; 427/359; 427/373; 427/378; 427/385.5; 427/395; 427/430.1
[58] Field of Search ............................... 427/208.4, 208.8, 427/210, 244, 359, 373, 378, 385.5, 395, 430.1; 118/60, 68, 101, 118, 123, 319, 325

[56] References Cited

U.S. PATENT DOCUMENTS

| | | |
|---|---|---|
| 2,940,591 | 6/1960 | Swedish, Jr et al. . |
| 3,503,495 | 3/1970 | Gustafson et al. . |
| 3,565,247 | 2/1971 | Brochman . |
| 4,156,754 | 5/1979 | Cobbs, Jr. et al. . |
| 4,415,615 | 11/1983 | Esmay et al. . |
| 5,322,709 | 6/1994 | Lulla et al. . |
| 5,605,717 | 2/1997 | Simmons et al. . |

*Primary Examiner*—Bernard Pianalto
*Attorney, Agent, or Firm*—Alston & Bird LLP

[57] ABSTRACT

A method and apparatus for making masking tape is provided. A hot melt or thermoplastic adhesive having no added foaming agents, blowing agents, or surfactants is applied to a paper backing having a moisture content, wherein the adhesive is at a temperature near or below the boiling point of water. The adhesive-coated tape is then advanced to a heating device and heat is applied thereto such that the moisture present in the tape is vaporized and dispersed throughout the adhesive to give the adhesive a foam-like quality.

30 Claims, 3 Drawing Sheets

PROCESS FOR MAKING MASKING TAPE AND APPARATUS

FIELD OF THE INVENTION

The present invention relates in general to a method and apparatus for making pressure-sensitive tape, and more particularly to a method and apparatus for making masking tape having a non-solvent based foamed adhesive.

BACKGROUND OF THE INVENTION

Pressure-sensitive tapes have been commercially used on a large scale for many years. Such tapes are widely used as maskings during painting, for sealing containers, and many other uses where a removably affixed tape is desirable. Pressure-sensitive tapes are commonly formed using solvent-based adhesives, whereby an adhesive composition is first dissolved in a volatile solvent and the solution is applied to a tape backing, such as a polymeric strip or a creped paper. Upon heating the adhesive-coated tape, the solvent evaporates to leave a pressure-sensitive adhesive on the backing. Although solvent-based adhesives perform satisfactorily, the use of solvents has certain disadvantages. More specifically, the evaporated volatile solvents must be collected and disposed of properly to avoid environmental pollution, and the solvents must not be overheated to avoid igniting the evaporated fumes.

Accordingly, other methods for making pressure-sensitive tapes have been developed that avoid the use of volatile solvents. In particular, hot melt or thermoplastic adhesives can be used as alternatives to solvent-based adhesives. Hot melt adhesives typically are dense, non-solvent based materials comprising a natural or synthetic polymer or polymeric composition and are applied to the backing through extrusion or similar processes. The material is normally solid or semi-solid at room temperature and becomes flowable upon heating to a higher temperature. Upon cooling, the material returns to a solid or semi-solid state.

Some of the early attempts at making masking tapes using hot melt adhesives were less than resounding successes. The early tapes used a solid layer of hot melt adhesive extruded onto the paper backing, which resulted in a slick finish that tended to yield high peel strengths. This was undesirable because it could be difficult to remove the tape from a surface. The early tapes also suffered from the problem of poor adhesion of the adhesive to the paper backing, which could result in the adhesive remaining on the surface to which the tape was applied instead of coming off with the backing when the tape was removed. Some tapes included a primer coating on one side of the tape to improve the bond between the adhesive and the tape, but the tapes still suffered from poor adhesion. These hot melt tapes were readily recognized by the shiny appearance of the adhesive side, and a resistance to these hot melt tapes, or any tape having a shiny appearance, developed in the marketplace.

Another problem with the early hot melt tapes was that the solid layer of hot melt adhesive had less volume compared to an equivalent weight of a solvent-based adhesive. Thus, applying a hot melt adhesive to the paper backing resulted in the tape having an overall thickness that was less than if an equivalent weight of solvent-based adhesive were used. Consequently, the hot melt tape when wound on a roll had a smaller overall diameter than the solvent-based tape, which was also undesirable in the marketplace.

Improvements have been made to hot melt adhesive tapes. In particular, peel strength as well as thickness problems have been improved by foaming the adhesive. Foaming of the adhesive is typically accomplished by adding to the adhesive composition a chemical foaming or blowing agent, which can be broadly classified as either chemical or physical. Chemical foaming or blowing agents form a foam or cell structure by decomposition of the foaming agent when a decomposition temperature is reached. Physical foaming agents, such as chlorinated hydrocarbons, ketones, and alcohols, cause a cell structure to form by evaporation upon heating. In both cases, heating the adhesive-coated tape causes the foaming agents to react and foam the adhesive. Also known are gaseous foaming agents, which are incorporated into a thermoplastic mix at a higher pressure and foam as the pressure is reduced. Thus, foaming or blowing agents cause tiny bubbles to form in the hot melt adhesive, giving the adhesive layer a porous or rough surface finish having improved release characteristics and better aesthetic qualities, such as a desirable dull surface finish.

In some cases moisture present in a release liner, such as a silicone coated paper, has been used as the foaming agent instead of added foaming or blowing agents in the hot melt adhesive. In particular, U.S. Pat. No. 5,605,717 to Simmons et al. ("the Simmons patent") discloses a process for vaporizing the moisture present in a release liner by applying a molten hot melt adhesive to a silicone-coated surface of the release liner to cause the moisture present therein to turn to gas and migrate as small bubbles from the silicone coated paper into the adhesive. However, the Simmons patent is not directed towards masking tapes and thus is not concerned with forming a strong bond between the adhesive and the release liner, as evidenced by providing a silicone coated paper instead of an uncoated paper. In addition, the Simmons patent discloses applying the adhesive in a molten state to the release liner to foam the adhesive. This may be disadvantageous in certain applications, such as when applying a very thin layer of adhesive to a thicker backing, because the backing can act as a heat sink and quickly cool the adhesive to below the boiling point of water such that foaming prematurely ceases.

As described above, chemical and physical foaming or blowing agents often are incorporated into the hot melt adhesive to improve the qualities thereof. However, such agents create additional costs in making the finished tape, as well as adding complexity to the process itself. Moreover, certain high-volatility foaming agents require a relatively high temperature to volatilize, which is undesirable as the high temperature may damage the backing. Simmons has suggested using moisture present in a release paper as a foaming agent but his method may not provide adequate control of the foaming process and may yield only moderate results. It would therefore be desirable to provide a pressure-sensitive masking tape having a foamed hot melt adhesive without the use of chemical or physical foaming or blowing agents. It would also be desirable to provide such a masking tape having a superior bond between the foamed adhesive and paper backing, yet having a desirable peel strength.

SUMMARY OF THE INVENTION

These and other needs are provided, according to the present invention, by a process and apparatus for making masking tape having a foamed adhesive, wherein the foamed adhesive is formed by moisture present in the tape that vaporizes and disperses through the adhesive to give the adhesive a foam-like quality. More specifically, in one embodiment of the invention, a hot melt adhesive without added foaming or blowing agents is applied to an uncoated surface of a backing, such as a creped paper having a moisture content of 2–8%, to form a laminate wherein the hot melt adhesive when applied to the backing is at a sufficiently low temperature that moisture in the backing remains substantially unvaporized. The laminate is then heated, such as by a forced air blower or heated roller, to cause the moisture in the backing to vaporize and disperse at least partially through the adhesive. Thus, the moisture in the backing acts as a foaming agent, thereby eliminating the need for added chemical or physical foaming or blowing agents in the hot melt adhesive as described above. In addition, heating the laminate also creates a desirable strong bond between the adhesive and the backing. Advantageously, the method can be used regardless of how thick the backing is in relation to the adhesive.

According to one embodiment of the present invention, the backing is paper based, such as creped paper, having a surface resembling tiny peaks and valleys. The paper backing has a relatively fixed moisture content, such as 2–8%, and in another embodiment about 3–5%, that is controlled by a conditioning unit. In addition, the backing may also include a release coat on the non-adhesive side to prevent the tape from adhering to itself when wound on a roll, and to inhibit the moisture contained therein from escaping in a direction other than through the adhesive. The adhesive is applied to the paper backing in a sufficiently non-flowable state so that it does not significantly flow down into the tiny valleys on the uncoated surface of the backing. Rather, the adhesive contacts the peaks of the backing and is substantially suspended over the valleys. Thus, the adhesive traps tiny amounts of air between the adhesive and the paper backing during the extrusion process. The adhesive-coated backing is then forwarded to a heating device to heat the combination to a temperature of about 300–500° F. in order to foam the adhesive and substantially adhere the adhesive to the backing. At this temperature, the moisture in the tape vaporizes and the air trapped between the adhesive and the tape expands, causing water vapor and air to disperse through the adhesive and give the adhesive a foam-like quality. Advantageously, no foaming or blowing agents are added to the hot melt adhesive to create the foam-like characteristics. In addition, the adhesive becomes sufficiently flowable to intimately adhere to the contour of the backing, thus forming an improved bond therebetween.

DETAILED DESCRIPTION OF THE PRESENT INVENTION

The present invention will now be described more fully hereinafter with reference to the accompanying drawings, in which preferred embodiments of the invention are shown. This invention may, however, be embodied in many different forms and should not be construed as limited to the embodiments set forth herein; rather, these embodiments are provided so that this disclosure will be thorough and complete, and will fully convey the scope of the invention to those skilled in the art. Like numbers refer to like elements throughout.

Figure 1:
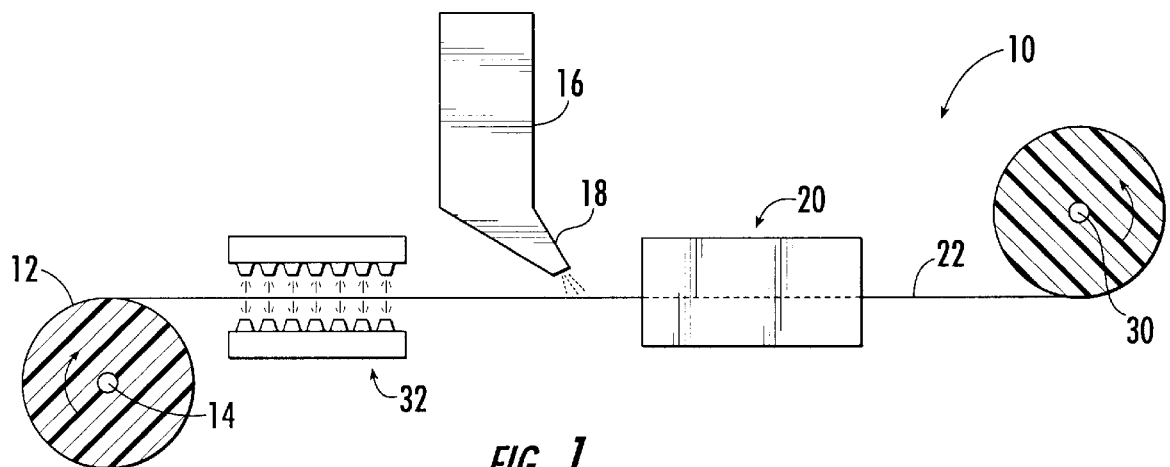
FIG. 1 is a diagram showing a process for forming a laminate comprising a foamed pressure sensitive adhesive and a backing according to the present invention.

Turning first to FIG. 1, a diagram is shown of an apparatus 10 in accordance with one embodiment of the present invention. As shown, the apparatus 10 comprises a roll of backing material 12 mounted to a let off roll 14, a coating device 16 comprising a die head 18, a heating device 20, and a take-up roll 30. However, the apparatus 10 can have other forms and other applications without departing from the spirit and scope of the present invention.

FIG. 1 illustrates one embodiment of the present invention for forming a laminate comprising a foamed pressure-sensitive adhesive and a backing. In particular, a roll of backing material 12 is provided having a relatively fixed moisture content throughout the roll. Advantageously, the moisture content is about 2–8%, and more preferably about 3–5%. As discussed more fully below, the resulting foamed pressure-sensitive adhesive is affected by the moisture content in the backing. Thus, the particular moisture content should be determined based on a desired amount of foaming of the adhesive and environmental conditions during processing, such as relative humidity and temperature in the operations environment. Other factors may be considered as well, such as line speed and heating processes.

In the embodiment shown in FIG. 1, a conditioning unit 32 is shown between the let off roll 14 and the coating device 16. The conditioning unit 32 comprises a plurality of nozzles for directing steam to both surfaces of the backing material 12. Depending on several conditions, such as line speed, type of backing material, and type of adhesive, the conditioning unit directs steam to the backing material 12 in order to provide the backing material with a moisture content of about 2–8%. Alternatively, the conditioning unit may be an off-line unit comprising any conditioning unit known in the art, such as a humidifier, such that the roll of backing material 12 may be stored in the conditioning unit for a sufficient time to achieve the desired moisture content uniformly throughout the roll. If the backing material 12 has a suitable moisture content without using the conditioning unit, the conditioning unit is not required. However, the conditioning unit provides a more precise level of preparation that may be desirable if the moisture content of the roll of backing material is not known or may have fluctuations throughout the roll.

The roll of backing material 12 is mounted on the let-off roll 14, which may be controlled by a brake or other tension controlling devices (not shown) in order to provide a suitable degree of tension to the backing material as it is processed through the apparatus 10. Alternatively, a series of tension rollers (not shown) may be used alone or in combination with the let-off roll 14 to provide tension in the backing material 12.

Figure 2:
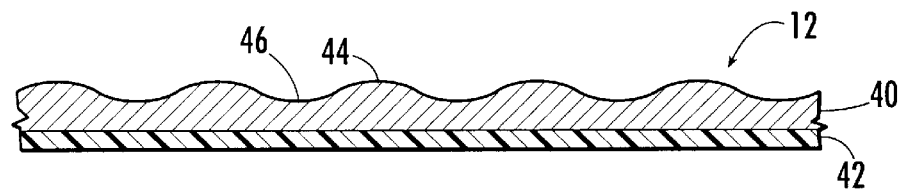
FIG. 2 is a cross-sectional view of a laminate according to the present invention.

As shown in FIG. 2, the backing material 12 comprises a backing layer 40 and a release coat 42. According to one embodiment, the backing layer 40 comprises creped paper, although other products, such as fiberglass or cloth, may also be used. In one embodiment, the backing layer 40 is approximately 1–7 mils in thickness and more particularly about 4 mils in thickness, and includes an uncoated side having a multiplicity of depressions in the surface thereof resembling a series of tiny peaks 44 and valleys 46. The peaks 44 and valleys 46 provide more surface area to the backing layer 40 and improve the adhesive characteristics thereof, as discussed more fully below. The release coat 42 is applied to the backing layer 40 on a side opposite the side to which a layer of adhesive 50 is applied and is allowed to dry before further processing. The release coat 42 comprises a latex or other water-based material, although other materials, such as solvent-based polymers or waxes, may also be used. The release coat 42 provides a barrier to the passage of moisture present in the backing material 12, as well as a release surface so that a finished roll of tape can be easily unrolled without excessively sticking to itself, as discussed more fully below.

Figure 3:
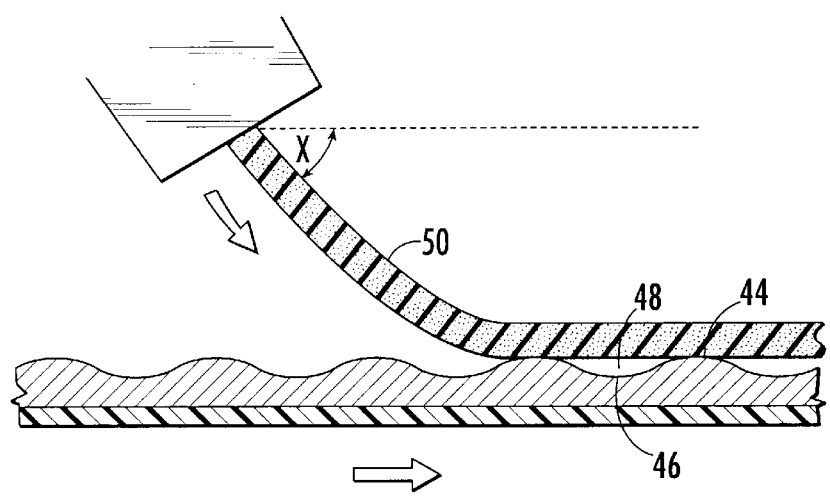
FIG. 3 is a cross-sectional view of a laminate comprising an adhesive and the laminate of FIG. 2.
Figure 4:
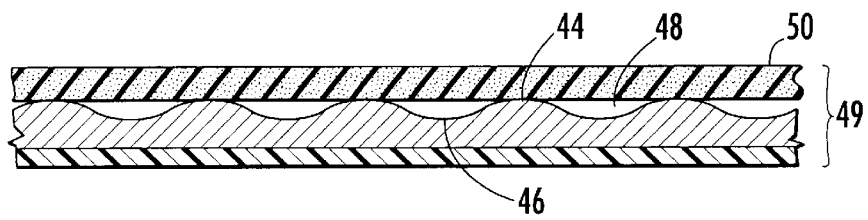
FIG. 4 is another cross-sectional view of the laminate of FIG. 3.

The backing material 12 is advanced to the coating device 16, wherein the layer of adhesive 50 is applied to the uncoated side of the backing layer 40. As shown in FIGS. 3 and 4, the layer of adhesive 50 exits the coating device 16 through a die head 18 and contacts the backing layer 40. More specifically, the coating device 16 receives a flow of molten hot melt adhesive 50 from a preparation unit (not shown). In one embodiment, the hot melt adhesive 50 comprises synthetic rubber and resin, wherein the rubber comprises 50% and the resin 50% by weight. Other combinations and/or materials may also be used, such as acrylic, butyl rubber, and silicone pressure-sensitive adhesives. Natural rubber compositions may also be used either alone or in combination.

Advantageously, the hot melt adhesive 50 does not contain foaming agents, blowing agents, or surfactants, which are well known in the art and have heretofore been recognized as desirable to promote and stabilize the foaming process. The hot melt adhesive 50 is extruded onto the backing material 12 through the die head 18, and may be extruded to provide a desired thickness of adhesive, typically about 0.1–10.0 mils, although the present invention is particularly desirable when using thicknesses of less than 2 mils. In one embodiment, the die head 18 is positioned such that the hot melt adhesive 50 is in a sufficiently "stiff" state when applied to the backing material 12 that air pockets 48 are created between the adhesive 50 and backing material. More specifically, the adhesive 50 is applied such that the adhesive does not follow the contour of the backing layer 40, i.e., the adhesive does not flow into the valleys 46 of the backing layer, but rather rests on the peaks 44 of the backing layer 40 and does not substantially flow down into the valleys 46 thereof. Thus, the air pockets 48 are created between the valleys 46 of the backing layer 40 and the adhesive 50. In addition to the temperature of the adhesive 50 when applied to the backing layer 40, the creation of the air pockets 48 may be also be influenced by positioning the die head 18 such that the adhesive 50 is extruded from the die head at an angle X relative to the surface of the backing 40. The angle X, which may be determined experimentally and ranges between 0–90°, and more specifically between 10–60°, takes into account several characteristics for the apparatus 10, such as line speed, adhesive temperature at the die head 18, and type of backing material 12. By extruding the adhesive 50 at angle X from the die head 18, the adhesive cools as it travels towards the backing layer 40 such that the adhesive is in a sufficiently stiff state when it contacts the backing layer that the adhesive rests upon the peaks 44 of the backing layer. As the angle X decreases, the adhesive 50 tends to travel a greater distance before contacting the backing layer 40. As such, the adhesive 50 cools to a greater extent as the angle X decreases because the adhesive has more time to cool and has more contact with air before reaching the backing. As the adhesive 50 cools it becomes less flowable, which causes the adhesive 50 to rest upon the peaks 44 of the backing layer 40 and resist flowing into the valleys 46. Thus, the amount of air trapped in the air pockets 48 and flowability of the adhesive 50 are at least partially controlled by the angle X of the die head 18, as a cooler adhesive 50 will trap more air in the air pockets 48 and a warmer adhesive will trap less air because the adhesive will be sufficiently flowable and extend toward the valleys 46, thus causing relatively smaller air pockets.

In one advantageous embodiment, the adhesive 50 when applied to the backing material 12 is near or below the boiling temperature of water, and thus at a temperature insufficient to cause substantial vaporization of the moisture in the backing layer 40. By applying the adhesive 50 at a temperature near or below the boiling temperature of water, the moisture will still be present in the backing layer 40 in the desirable amount for the subsequent foaming process. The foaming process of the present invention is particularly advantageous when very thin layers of adhesive 50 are used. For example, when the adhesive 50 applied to the backing layer 40 is very thin (e.g., 1 mil before foaming) in relation to the backing, the temperature of the adhesive may drop rapidly as the adhesive contacts the backing material 12 because the backing material acts as a heat sink to rapidly draw heat away from the adhesive. In the aforementioned Simmons patent, the adhesive is above the boiling point of water when the adhesive is applied to the release liner in order to foam the adhesive by vaporizing the moisture present in the release liner. In this type of process, the rapid temperature drop may cause a very thin layer of adhesive to quickly cool below the boiling point of water, which ceases any further vaporization of the moisture in the release liner. As a result, the moisture in the release liner may not substantially vaporize and disperse throughout the adhesive, which may cause inferior foaming of the adhesive.

By contrast, the present invention allows more precise control of the moisture in the backing layer 40 and of the vaporization of the moisture, by applying the adhesive 50 to the backing material 12 at a temperature near or below the boiling point of water and then advancing the adhesive and backing material to a heating device 20. More specifically, the subsequent heating of the tape using the heating device 20 allows the moisture to substantially vaporize and disperse throughout the adhesive with more control and precision than conventional systems. As such, the present invention allows for the use of very thin adhesives while achieving adequate foaming, as discussed more fully below.

After the adhesive 50 is applied to the backing material 12 to create an adhesive-coated tape 49, the tape is advanced to the heating device 20. The heating device 20 provides heat to the adhesive-coated tape 49 sufficient to substantially vaporize the moisture in the tape and cause the vapor to disperse through the adhesive 50 so as to foam the adhesive. Where the adhesive has been applied so as to trap air as described above, the trapped air in the air pockets 48 is also heated by the heating device 20 and expands through the adhesive 50 so as to further foam the adhesive.

Figure 5:
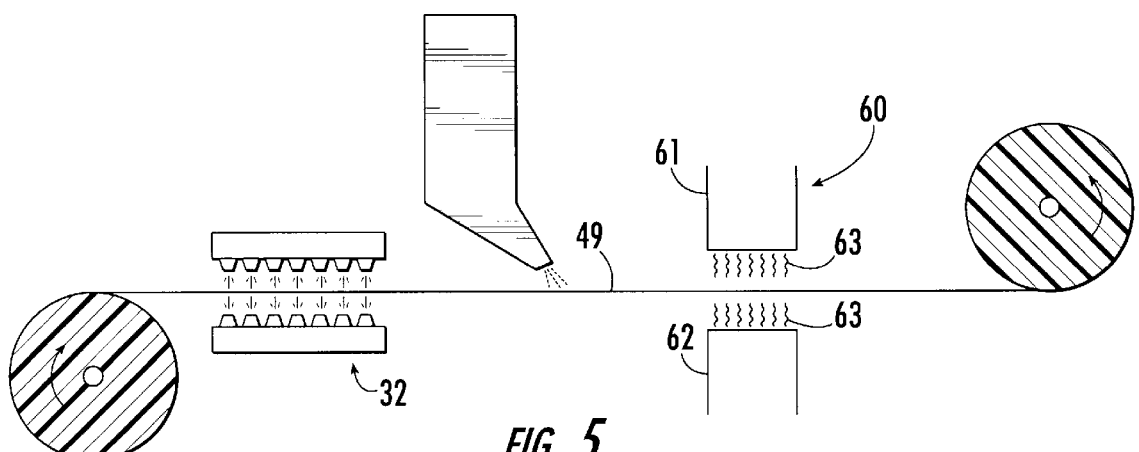
FIG. 5 is a diagram showing a process for forming a foamed pressure sensitive adhesive comprising a forced air heater according to one embodiment of the present invention.
Figure 6:
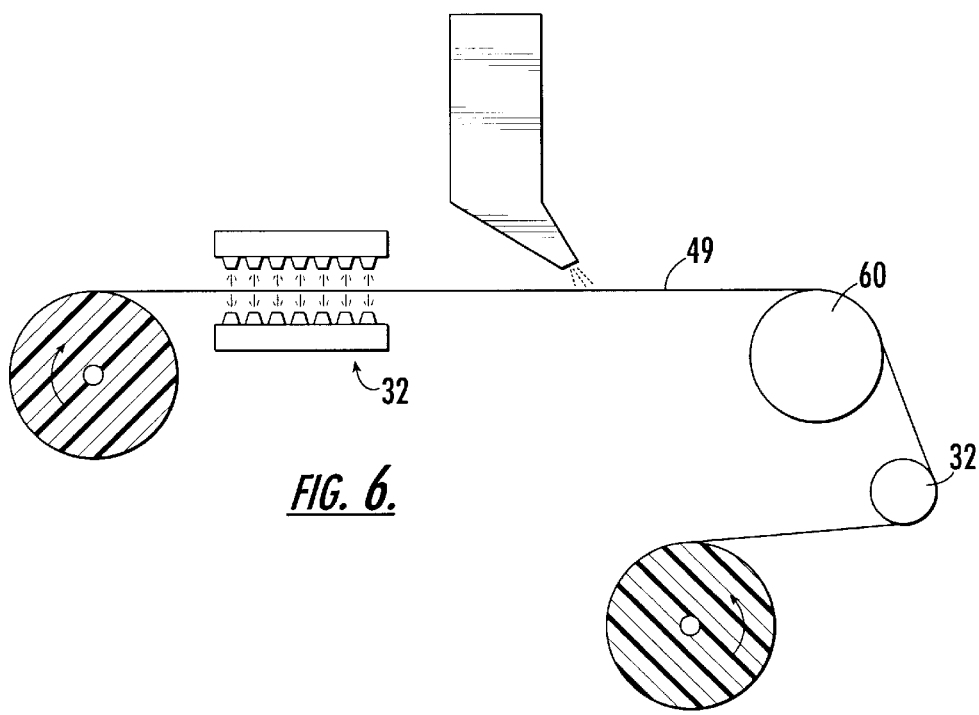
FIG. 6 is a diagram showing a process for forming a foamed pressure sensitive adhesive comprising a heated roll according to another embodiment of the present invention.

FIG. 5 shows one embodiment of the present invention wherein the heating device 20 is a forced air heater 60. Individual heating elements 61, 62 force heated air 63 against the adhesive-coated tape 49. In one embodiment, the heated air 63 exits from the heating elements 61, 62 at a temperature of about 500–600° F. so that the adhesive-coated tape 49 is heated to a surface temperature of about 300–400° F. Other temperatures for the heated air 63 may be used, however, depending on other factors, such as line speed and the moisture content in the adhesive layer 40. FIG. 6 shows another embodiment of the present invention wherein the heating device 20 is a heated roll 60. The heated roll 60 may be heated by any method known in the art, such as by electricity, hot oil, or the like. In one embodiment, the heated roll 60 contains hot oil at a temperature of about 500° F., such that the adhesive-coated tape 49 is heated to a surface temperature of about 300–400° F. Although FIGS. 5 and 6 show two embodiments of the heating device 20, the heating device can be of many other configurations, such as infrared or microwave, without departing from the spirit and intent of the present invention.

As mentioned above, the heating device 20 heats the adhesive-coated tape 49 to a temperature of about 300–400°. At this temperature, the moisture in the tape 49 substantially vaporizes and disperses through the adhesive 50 so as to give the adhesive a foam-like quality. In one embodiment, the trapped air in the air pockets 48 is also heated and expands throughout the adhesive 50. Advantageously, the release coat 42 prevents the moisture and trapped air from escaping in a direction away from the adhesive 50 so that substantially all of the liberated water vapor in the tape 49 and trapped air in the air pockets 48 are dispersed throughout the adhesive. Additionally, the adhesive 50 is heated to become sufficiently flowable so that the adhesive flows into the valleys 46 of the backing surface 40 and thus intimately adheres to the contour thereof so that a stronger bond is formed therebetween. Thus, the present invention allows trapped air and water vapor to act as foaming agents, yet provides sufficient adhesion between the adhesive 50 and the backing layer 40. Although other systems, such as the aforementioned Simmons patent, disclose a foamed adhesive without the use of added foaming or blowing agents, the present invention is particularly advantageous for paper masking tapes, where good adhesion between the adhesive and the backing layer is desired. The Simmons patent, on the other hand, is not directed to making masking tape, as evidenced by the inclusion of a silicone coated paper such that the adhesive is able to release therefrom. Accordingly, the Simmons patent is not concerned with the adhesion between the adhesive and the backing layer.

Figure 7:
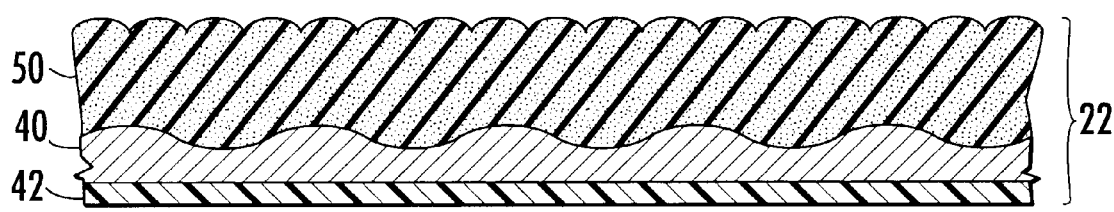
FIG. 7 is another cross-sectional view of the laminate of FIG. 3 after the laminate is heated.

FIG. 7 shows a cross-section of a foamed tape laminate or masking tape 22. As depicted, the adhesive 50 has a foam-like quality and has increased in volume and thickness. In one embodiment, the foamed adhesive 50 has a thickness of about 2 mils. In addition, the adhesive 50 follows the contour of the backing layer 40, thus eliminating the air pockets 48 and providing more contact surface area and a stronger bond between the adhesive 50 and the backing layer 40. The foamed masking tape 22 is then advanced to a take-up roll 30. The take-up roll 30, according to one embodiment, is a motor-driven roll which is known in the art. Other take-up devices may also be used, such as an accumulator. In one embodiment shown in FIG. 6, the foamed masking tape 22 may encounter at least one roller 32 before the take-up roll 30 in order to provide tension to the foamed masking tape 22. The foamed masking tape 22 should also be sufficiently cooled before being wound onto the take-up roll 30. More specifically, the foamed masking tape 22 should be cooled to a temperature no greater than about 200° F. in order to adequately solidify the adhesive 50 and secure contact between the adhesive and the backing layer 40. This cooling can be achieved simply by exposing the tape 22 to air.

From the foregoing it will be seen that there has been shown and described a unique process and apparatus for making a masking tape without adding foaming agents, blowing agents, or surfactants to the adhesive. While particular embodiments of the invention have been shown and described, it will be understood that the invention is not limited thereto since modifications may be made by those skilled in the art, particularly in light of the foregoing teachings. It is therefore contemplated by the following claims to cover any such modifications and incorporate those features which constitute the essential features of these improvements within the true spirit and the scope of the invention.

That which is claimed:

1. A method of making a pressure-sensitive adhesive product, comprising:
   heating a hot melt adhesive composition until the adhesive is flowable, the adhesive being free of blowing or foaming agents;
   coating the adhesive onto a backing having a moisture content of 2–8% so as to form a laminate, the adhesive being coated at a sufficiently low temperature that the moisture in the backing remains substantially unvaporized; and
   heating the laminate to cause the moisture in the backing to vaporize and disperse through the adhesive so as to give the adhesive a foam-like quality.

2. A method according to claim 1, wherein the coating step comprises coating the adhesive onto a backing comprising creped paper.

3. A method according to claim 1, wherein the coating step comprises coating the adhesive onto a backing having a moisture content of 3–5%.

4. A method according to claim 1, further comprising conditioning the backing using a moisturizer to regulate the moisture content of the backing.

5. A method according to claim 1, wherein the laminate is heated by a forced air blower.

6. A method according to claim 1, wherein the laminate is heated by passing the laminate over a surface of a heated roller.

7. A method according to claim 1, wherein the coating step comprises coating the adhesive onto a first side of the backing, and wherein a release coat is applied to an opposite second side of the backing.

8. A method according to claim 7, wherein the release coat is applied to the backing prior to coating the adhesive onto the backing.

9. A method according to claim 1, wherein the coating step comprises coating the adhesive onto a backing formed of paper, the adhesive being coated onto a side of the backing that is free of any release coating.

10. A method according to claim 1, wherein the coating step comprises coating the adhesive onto a backing such that air is trapped therebetween.

11. A method according to claim 10, wherein the coating step further comprises coating the adhesive onto the backing by extrusion through a die head, and adjusting the die head relative to the backing to control flowability of the adhesive such that the adhesive traps air between the adhesive and depressions formed in the backing.

12. A method according to claim 10, wherein the heating step comprises heating the laminate such that the air trapped between the backing and adhesive expands and disperses through the adhesive to give the adhesive a foam-like quality.

13. A method according to claim 1, further comprising bonding the adhesive to said backing.

14. A method of making a pressure-sensitive adhesive product, comprising:

heating a hot melt adhesive composition until the adhesive is flowable, the adhesive being free of blowing or foaming agents;

coating the adhesive onto a surface of a backing so as to form a laminate, the surface of the backing having a multiplicity of depressions therein and the adhesive being coated at a sufficiently low temperature so that the adhesive traps air in pockets between the adhesive and the depressions; and;

heating the laminate to cause the air pockets to expand and disperse through the adhesive so as to give the adhesive a foam-like quality.

15. A method according to claim 14, wherein the coating step comprises coating the adhesive onto a backing comprising creped paper.

16. A method according to claim 14, wherein the laminate is heated by a forced air blower.

17. A method according to claim 14, wherein the laminate is heated by passing the laminate over a surface of a heated roller.

18. A method according to claim 14, wherein the coating step comprises coating the adhesive onto a first side of the backing, and wherein a release coat is applied to an opposite second side of the backing.

19. A method according to claim 18, wherein the release coat is applied to the backing prior to coating the adhesive onto the backing.

20. A method according to claim 14, wherein the coating step comprises coating the adhesive onto a backing formed of paper, the adhesive being coated on a side of the backing that is free of any release coating.

21. A method according to claim 14, wherein the coating step comprises coating the adhesive onto the backing by extrusion through a die head, and adjusting the die head relative to the backing to control flowability of the adhesive such that the adhesive traps air between the adhesive and the depressions formed in the backing.

22. A method according to claim 14, further comprising bonding the adhesive to said backing.

23. An apparatus for making a foamed adhesive product, comprising:

a moisturizer operable to moisturize a web of a backing material such that the backing has a moisture content of 2–8%;

a drive system operable to advance said backing having a moisture content of 2–8% along a path;

a coating device operable to extrude a flowable hot melt adhesive through a die head of the coating device onto the advancing backing to form a laminate; and a heating device located along said path downstream from said die head, the backing being advanced by said drive system along said path past said die head, said coating device extruding the hot melt adhesive onto said backing forming said laminate, said drive system advancing said laminate to said heating device, whereby said heating device heats said laminate such that said moisture in said backing vaporizes and disperses through said adhesive to give the adhesive a foam-like quality.

24. The apparatus according to claim 23, wherein said moisturizer is operable to produce a moisture content of 3–5% in said backing.

25. The apparatus of claim 23, wherein said heating device is a forced air blower.

26. The apparatus of claim 23, wherein said heating device is a heated roller and said drive system advances the laminate over a surface of the heated roller.

27. The apparatus of claim 23, wherein said die head is adjustable so as to regulate an angle defined between the backing and the direction along which the adhesive is extruded from the die head.

28. The apparatus of claim 23, wherein said die head is positioned so that air is trapped between said hot melt adhesive and said backing.

29. The apparatus of claim 28, wherein said heating device heats said laminate such that said trapped air expands and disperses through said adhesive to give the adhesive a foam-like quality.

30. The apparatus of claim 23, wherein the heating device heats said laminate such that a bond is formed between the backing and the adhesive.

* * * * *